United States Patent
Qian et al.

(10) Patent No.: US 9,765,229 B2
(45) Date of Patent: Sep. 19, 2017

(54) INK COMPOSITION AND A WRITING INSTRUMENT

(71) Applicant: SHANGHAI NNW NEW MATERIALS TECHNOLOGY CO., LTD., Shanghai (CN)

(72) Inventors: Wei Qian, Shanghai (CN); Ling Cheng, Shanghai (CN); Yong Sang, Shanghai (CN)

(73) Assignee: SHANGHAI NNW NEW MATERIALS TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/011,407

(22) Filed: Jan. 29, 2016

(65) Prior Publication Data

US 2016/0145454 A1    May 26, 2016

(30) Foreign Application Priority Data

Sep. 9, 2015   (CN) .......................... 2015 1 0570055

(51) Int. Cl.
  *C09D 11/17*   (2014.01)
  *B43K 8/03*    (2006.01)
  *B43K 8/02*    (2006.01)

(52) U.S. Cl.
  CPC ............. *C09D 11/17* (2013.01); *B43K 8/02* (2013.01)

(58) Field of Classification Search
  USPC .......................................... 524/441; 523/161
  See application file for complete search history.

(56) References Cited

U.S. PATENT DOCUMENTS

| | | | |
|---|---|---|---|
| 4,545,819 A * | 10/1985 | Shioi | C09D 11/50 106/1.05 |
| 5,762,694 A | 6/1998 | Yokoi et al. | |
| 6,083,311 A | 7/2000 | Kanbayashi et al. | |
| 6,099,629 A | 8/2000 | Morita et al. | |
| 6,616,741 B1 | 9/2003 | Sawa et al. | |
| 8,273,170 B2 * | 9/2012 | Tsukiana | C09D 11/322 106/31.9 |
| 8,617,646 B2 * | 12/2013 | Sexton | C09D 11/17 106/31.73 |
| 8,846,797 B2 * | 9/2014 | Sexton | C09D 11/16 401/196 |
| 2009/0025602 A1 | 1/2009 | Kwan et al. | |
| 2010/0047199 A1 * | 2/2010 | Trummer | C09C 1/646 424/61 |
| 2014/0186529 A1 | 7/2014 | Sexton et al. | |

* cited by examiner

*Primary Examiner* — Vu A Nguyen
(74) *Attorney, Agent, or Firm* — Zareefa B. Flener; Flener IP Law

(57) ABSTRACT

The present invention relates to an ink composition and a writing instrument. The ink composition comprises 10 to 70 wt % of a metallic pigment, 10 to 30 wt % of a resin, 0 to 20 wt % of a colorant, 0 to 20 wt % of an auxiliary agent and a solvent as the remainder; the solvent is a main solvent or a mixture of the main solvent and an auxiliary solvent; the resin includes a film-forming resin and a thickening resin; the present invention uses a low-level monohydric alcohol solvent as the main solvent, a polyvinyl acetal resin as the film-forming resin, and further includes the auxiliary agent, the metallic pigment or the colorants, so the ink composition with such good characteristics as being environmental friendly, drying quickly, being written smoothly and having strong compatibility to general writing surfaces is produced.

8 Claims, No Drawings

INK COMPOSITION AND A WRITING INSTRUMENT

FIELD OF THE INVENTION

The present invention relates to a field of ink technology, involving an ink composition and a writing instrument.

BACKGROUND

A metallic ink has gained wide popularity because its written markings have intense metallic glittering effects; so many products concerning the metallic ink have been on the market in recent decades.

The earlier metallic ink generally uses aliphatic hydrocarbons or long-chain organic compounds as its solvent. However, these compounds are mostly derived from fossil fuels, and large quantities of pollutants are generated during its production process and are easy to cause severe pollution of the environment, which is not conducive to energy conservation and environmental protection. Furthermore, the use of organic compounds as solvents could do some harm to human bodies and environments in most cases. For example, in the U.S. Pat. No. 8,846,797 B2, the preferred solvent is naphtha. Although the patent can solve such problem that a metallic ink composition is unable to be stably stored in and be written by a cotton core-type writing instrument for a long time, the naphtha can damage nervous systems of human bodies, and bring health risks to users to a certain extent.

In order to address the problems regarding environmental protection and safety of human bodies, most of the current metallic ink compositions use water as a solvent to dissolve and disperse various components therein to prepare water-based ink compositions, e.g. the water-based metallic ink compositions disclosed by the U.S. Pat. No. 6,099,629, U.S. Pat. No. 6,083,311, U.S. Pat. No. 6,616,741 B1 and the like. Since water-based metallic inks have long drying time and is difficult to achieve the purpose of quick drying in short time, for the writer, such problem as inadvertently polluting writing surfaces may happen during continuous writing. Besides, the following problems can be caused by the use of water as the main solvent of metallic ink compositions, namely the metallic pigments especially aluminum pigments can produce hydrogen gas in aqueous system, which can bring about some dangers during processing and storage of this kind of metallic ink composition and is not conductive to long-distance transportation; At the same time, that the water's surface tension is relatively high may result in that this kinds of inks have bad spreadability on some smooth and clean surfaces, which leads to such problems as shrinkage of borders, shrinkage of cavity and the like and then limits its scope of application.

SUMMARY OF THE INVENTION

In order to solve the above problems, the main purpose of the present invention is to provide an ink composition, which can be pollution-free and have strong compatibility to general writing surfaces.

The present invention also provides a writing instrument that is capable of loading the above-mentioned ink composition and matching its performance.

To achieve the above purposes, the present invention employs the following technical solutions:

An ink composition comprises a metallic pigment, a resin, a colorant, an auxiliary agent and a solvent.

Wherein, contents of each component of the ink composition can be as follows:

| | |
|---|---|
| the metallic pigment | 10 to 70 wt %; |
| the resin | 10 to 30 wt %; |
| the colorant | 0 to 20 wt % |
| the auxiliary agent | 0 to 20 wt %; |
| the solvent | as the remainder. |

Or, contents of each component of the ink composition can also be as follows:

| | |
|---|---|
| the metallic pigment | 20 to 50 wt %; |
| the resin | 10 to 20 wt %; |
| the colorant | 5 to 15 wt % |
| the auxiliary agent | 2 to 15 wt %; |
| the solvent | as the remainder. |

Or, contents of each component of the ink composition can be also as follows:

| | |
|---|---|
| the metallic pigment | 30 to 45 wt %; |
| the resin | 10 to 15 wt %; |
| the colorants | 7 to 12 wt % |
| the auxiliary agent | 3 to 12 wt %; |
| the solvent | as the remainder. |

The solvent is a main solvent or a mixture of the main solvent and an auxiliary solvent.

The main solvent can be a low-level monohydric alcohol solvent. The auxiliary solvent can be any one or more than one of a polyols solvent, an ether solvent and an ester solvent that are capable of mutually dissolving into the low-level monohydric alcohol solvent.

The low-level monohydric alcohol solvent can be preferably selected from any one or more than one of ethanol, propanol, butanol and pentanol; the polyols solvent can be dihydric alcohol or trihydric alcohol; the ether solvent can be any one or more than one of propylene glycol methyl ether, butyl glycol methyl ether and dipropylene glycol methyl ether; the ester solvent can be any one or more than one of ethyl acetate and butyl acetate.

The metallic pigment can be selected from any one or more than one of metallic elements from the I B group, the II B group and the III A group of the periodic table of the elements. Surfaces of the metallic pigment can be coated by silica and long-chain aliphatic compound. At this point, the metallic pigment content in the ink composition is the percentage ratio of weight of the metallic pigment coated by silica and long-chain aliphatic compound to total weight of the ink composition.

The metallic pigment can be preferably selected from Cu, Zn, Al or Cu—Zn alloy. If the metallic pigment is Cu—Zn alloy, the mass ratio of Cu to Zn can be (60-80):(40-20). The average particle size of the metallic pigment after surface coating treatment is 2 to 15 μm.

The resin can include a film-forming resin and a thickening resin.

The film-forming resin can be polyvinyl butyral resin, modified products of the polyvinyl butyral resin, polyvinyl alcohol resin or polyvinyl pyrrolidone resin and can be more preferably selected from polyvinyl butyral resin, glutaraldehyde-modified products of the polyvinyl butyral resin or aromatic dialdehydes—modified products of the polyvinyl butyral resin.

The thickening resin can be preferably selected from phenolic resin, amine-modified products of the phenolic resin, organic silicon-modified products of the phenolic resin, alkyd resin, acrylic acid-modified products of the alkyd resin or organic silicon-modified products of the alkyd resin.

Weight ratio of the film-forming resin to the thickening resin can be 1:(1-20), preferably 1:(2-10), more preferably 1:(3-8).

The colorant can be organic pigment. The organic pigment can be phthalocyanine pigment or azo pigment.

The auxiliary agent can be any one or more than one of a wetting dispersant, a viscosity conditioning agent and an organic amine.

The wetting dispersant can be a mixture of block copolymer and wetting type organic silicon compounds; the viscosity conditioning agent can be an anti-settling wax or a fumed silica; the organic amine can be triethanolamine.

A writing instrument comprises a ink reservoir for storing the above mentioned ink composition, and a writing component that is connected to the ink reservoir via pipeline and used for writing the ink composition onto media.

As a result of the adoption of the above-mentioned solutions, the present invention has the following advantageous effects.

Firstly, the present invention mainly adopts a low-level monohydric alcohol solvent as the main solvent to dissolve each component of the ink composition. Due to lower boiling point of the low-level monohydric alcohol solvent, while written markings are formed on the media surfaces, the writing markings will dry in a very short time, which is not easy to lead to the problems that the media surfaces are polluted.

Secondly, when written markings are formed on the surfaces of writable media by the use of the ink composition of the present invention, the low-level monohydric alcohol solvent contained in writing markings can quickly degrade in a natural environment without causing obvious pollution. In addition, the mass production of low-level monohydric alcohol solvent can be achieved by fermentation method and large quantities of pollutants cannot be produced in the production process thereof, which is beneficial to environmental protection.

Thirdly, due to lower surface tension of the low-level monohydric alcohol solvent, the ink composition of the present invention has better spreading abilities on smoother and cleaner surfaces and is less likely to induce problems such as shrinkage of borders, shrinkage of cavity and the like, thereby being applicable to more writing media.

Fourthly, since the present invention mainly adopts low-level monohydric alcohol solvent, it is not easy for the metallic pigment to make it produce hydrogen gas, which significantly reduces the risks caused by that metallic ink composition during its processing and storage.

Fifthly, the film-forming resin of the present invention contains a polyvinyl butyral resin and its modified products. As the polyvinyl butyral resin and its modified products have excellent film-forming abilities and better adhesive strength, the ink composition of the present invention is able to be written on surfaces of a variety of writing media (e.g. water surfaces or oil surfaces), which efficaciously solves the problems that the current water-based ink composition has insufficient adhesive force and bad film-forming property when written on water surfaces or oil surfaces, making the ink composition of the present invention gain strong compatibility to general writing surfaces.

DETAILED DESCRIPTION OF PREFERRED EMBODIMENTS

The present invention provides an ink composition and a writing instrument that uses the ink composition.

[An Ink Composition]

An ink composition at least comprises a metallic pigment, a resin and a solvent, but according to specific circumstances, it can also comprise a colorant and/or an auxiliary agent.

Wherein, contents of each component of the ink composition can be as follows:

| | |
|---|---|
| the metallic pigment | 10 to 70 wt %; |
| the resin | 10 to 30 wt %; |
| the colorant | 0 to 20 wt % |
| the auxiliary agent | 0 to 20 wt %; |
| the solvent | as the remainder. |

Contents of each component of the ink composition can also be as follows:

| | |
|---|---|
| the metallic pigment | 20 to 50 wt %; |
| the resin | 10 to 20 wt %; |
| the colorant | 5 to 15 wt %; |
| the auxiliary agent | 2 to 15 wt %; |
| the solvent | as the remainder. |

Contents of each component of the ink composition can also be as follows:

| | |
|---|---|
| the metallic pigment | 30 to 45 wt %; |
| the resin | 10 to 15 wt %; |
| the colorant | 7 to 12 wt %; |
| the auxiliary agent | 3 to 12 wt %; |
| the solvent | as the remainder. |

Content of each component of the ink composition can be randomly adjusted within their respective numerical ranges to form new combinations, so long as that the sum of contents of each component is 100 wt % and the finally formed ink composition can attain the goal of the invention.

<A Metallic Pigment>

The metallic pigment is used to make the ink composition of the present invention to form writing signs or writing markings with better metallic luster on writing media, which gives them flashing, sparkling and glittering effects.

The metallic pigment can be selected from any one or more than one of metallic elements from the I B group, the II B group and the III A group of the periodic table of the elements and can be preferably selected from Cu, Zn, Al or Cu—Zn alloy. If the metallic pigment is Cu—Zn alloy, the mass ratio of Cu to Zn can preferably be (60-80):(40-20).

The metallic pigment can be preferably selected from the metallic pigment with its surface being coated by silica and long-chain aliphatic compound. At this point, the metallic pigment content in the ink composition is the percentage ratio of weight of the metallic pigment coated by the silica and the long-chain aliphatic compound to total weight of the ink composition, wherein, the long-chain aliphatic compound is preferably selected from the aliphatic compound with the number of carbon atoms at 16 to 21. For example, if the surface of aluminum is treated with silica and stearic acid (i.e. stearyl acid) together, fumed silica is pressed into the stearic acid layer that covers the outer layers of aluminum sheets during grinding process.

Compared with uncoated metallic pigment and the metallic pigment solo coated by silica or long-chain aliphatic compound, the metallic pigment mechanically coated by both silica and long-chain aliphatic compound has the following advantages.

(1). It has a better and more lasting metallic luster. Surfaces of uncoated metallic pigment are easy to be corroded and oxidized and is likely to lose metallic luster when being exposed to air for a long time; although the metallic pigment solo coated by silica is more resistant to corrosion, surfaces of the silica is relatively inert and it is necessary to modify silicon source. The preparation process may be more complicated; If the metallic pigment is solo coated by the long-chain aliphatic compound, since the long-chain aliphatic compound in coating films is easily dissolved in alcohol-based solvent (such as low-level monohydric alcohol solvent), the protective effects of coatings can decrease and even be lost completely, leading to sharp reduction in metallic pigment's resistance to corrosion; If the metallic pigment is coated by both silica and long-chain aliphatic compound, since it has dense silica-coating layer, the pigment's resistance to corrosion can be improved, and meanwhile the silica-coating layers are easier to adsorb long-chain aliphatic compounds and have the anchoring effects on the long-chain aliphatic compounds at outer periphery of silica-coating layer, thus improving the metallic pigment's dispersity and distribution properties, etc. and making the writing markings display better metallic luster.

(2). It has better dispersion, suspension and distribution properties. Surfaces of uncoated metallic pigment are not easily dissolved in alcohol-based solvent so that components such as corresponding auxiliary agent or resin and the like do not easily from aggregation on the surfaces of metallic pigment layers, thus it is more difficult to achieve good dispersion effects, which is easy to lead to the aggregation and sedimentation between the metallic pigment layers in the alcohol-based solvent; the metallic pigment solo coated by silica, though it has better suspendability, the metallic pigment layers are not easy to distribute orientationally during solvent-deprivation and film-forming processes; the metallic pigment solo coated by long-chain aliphatic compounds, as coating layers are easily destroyed in the alcohol-based solvent, is not easy to disperse and suspend in alcohol-based solvent. When the metallic pigment is coated by both silica and long-chain aliphatic compounds, as the long-chain aliphatic compounds at its outer periphery are reinforced and thickened by silica layer, leading to that it is easily dissolved in the alcohol-based solvents and auxiliary agent and resin are easy to aggregate on the surfaces of the metallic pigment, which provides a good ionized layer and steric hindrance so that the metallic pigment gains good dispersion and suspension effects in the alcohol-based solvent. Therefore, the present invention preferably selects the metallic pigment coated by both silica and long chain aliphatic compound.

The average particle size of the metallic pigment after surface-coating treatment is 2 to 15 μm which satisfies such requirement that it shall be far less than average pore size of nib gap at 50 to 200 μm in writing instruments and in this way the metallic pigment particles can pass smoothly through the nib gap without causing the blockage of the nib gap.

In the ink composition of the present invention, if the content of the metallic pigment is too low, writing markings cannot display fine metallic luster and gloss; if the content is too high, the ink's long-term storage stability and its utility can be affected.

<A solvent>

The solvent in the present invention includes a main solvent and an auxiliary solvent.

Wherein, the main solvent is the major carrier of ink's components and plays a role in dispersing or dissolving any other components in the ink composition.

The main solvent is alcohol-based solvent and the alcohol-based solvent is low-level monohydric alcohol solvent, i.e. any one or more than one of ethanol, propanol, butanol and pentanol.

The main solvent is an alcohol-based solvent, because it has extremely low toxicity, rapid evaporation speed and excellent wetting ability, which can make the ink composition achieve environmental protection property, fast drying property and general compatibility to writing surfaces of different media.

The auxiliary solvent can be mutually miscible with the main solvent, adjust main solvent's polarity and/or volatility and other properties and assist the main solvent in dispersing and dissolving any other components of the ink composition.

The auxiliary solvent is any one or more than one of a polyols solvent, an ether solvent and an ester solvent that are capable of mutually dissolving into the main solvent. Wherein, the polyols solvent can be any one or two of dihydric alcohol or trihydric alcohol. The dihydric alcohol can be propanediol or butanediol, and the trihydric alcohol can be glycerol. The ether solvent can be any one or two of propylene glycol methyl ether, butyl glycol methyl ether and dipropylene glycol methyl ether. The ester solvent can be any one or two of ethyl acetate and butyl acetate.

When the main solvent is mixed with the auxiliary solvent, the polarity of the ink composition can be adjusted to improve the dispersion and suspension effects of the metallic pigment in the main solvent (leaf floating effect) and then be conducive to the dissolution of the resin in the main solvent, making it easily enter interspace between the metallic pigment layers to form aggregates so as to raise the suspension property of the metallic pigment in the main solvent and at the same time bring good moisturizing property to the ink composition, too.

<A Resin>

The resin is mainly used as a binding agent for other components of the ink composition during the drying and film-forming processes, and meanwhile provides the ink with viscosity, stability, film forming ability and other properties.

In the ink composition of the present invention, if the resin content is too low, the ink cannot attain to required viscosity, which influences the stability and writing performance of the ink, resulting in such problems as uneven markings or non-coloration; If the resin content is too high, it can lead to that the ink has too high viscosity which can also affect the writing performance and even cause such problems as dry and unsmooth writing or discontinuous writing markings.

The resin in the invention includes a film-forming resin and a thickening resin.

The film-forming resin is used to make the ink composition form smooth and even writing markings or writing signs on surfaces of writing media and are able to enhance the directional alignment of the metallic pigment, and then has some influence on facilitating dispersion of the metallic pigment, thereby beneficial for writing markings or writing signs to generate sparkling metallic luster.

The film-forming resin is selected from the resin with good film-forming property. The present invention selects poly ketone resin or polyvinyl acetal resin, etc. and can be preferably selected from polyvinyl butyral resin, modified products of polyvinyl butyral resin, polyvinyl alcohol resin or polyvinyl pyrrolidone resin, and can be more preferably selected from polyvinyl butyral resin, glutaraldehyde modified products of polyvinyl butyral resin or aromatic dialdehydes modified products of polyvinyl butyral resin.

For example, polyvinyl butyral resin (PVB, for short) is formed by condensation of polyvinyl alcohol (PVA, for short) and butylaldehyde under the action of catalyst. Polyvinyl butyral resin shows good solubility in alcohol-based solvent and has good film-forming property, which facilitates the good dispersity of the metallic pigment.

The use of polyvinyl butyral resin are able to improve the uniformity of writing markings, to enhance its adhesive force so that the writing markings are not easy to be erased and at the same time to be favorable for ink's general compatibility to various writing surfaces and then provide goodsense of writing smoothness.

The metallic luster of writing markings is obtained by alignment of metallic pigments. Currently the commonly used metallic pigment is in flaky shape. If its lamellar structure parallels with surfaces of writing markings and basal substrate, namely a directional alignment of the metallic pigment is achieved, the whole film of writing markings can attain spectacular optical effects and an outstanding metallic luster can be seen, which requires shorter drying time of ink and thinner film thickness of writing markings. If polyvinyl butyral resin and its modified products are used, film thickness of writing markings can be reduced to the greatest extent. Meanwhile, the solvent used in the present invention can provide fairly fast drying time, which is highly conducive to the directional alignment of the metallic pigment so that writing markings with excellent metallic luster can be obtained. Similarly, other kinds of polyvinyl acetal resin also have similar functions and can be selected according to the actual conditions (e.g. types of the metallic pigment, types of solvent, etc.) and the required effects (e.g. luster, film thickness, etc.). As is described above, the polyvinyl acetal resin is a much better option for the film-forming resin in this ink composition.

The thickening resin is used to adjust the viscosity of the ink composition, to make sedimentation velocity of the metallic pigment particles become slower in the composition and then to improve the suspension stability of the ink composition.

The thickening resin can be phenolic resin, amine-modified products of phenolic resin, organic silicon-modified products of phenolic resin, alkyd resin, acrylic acid-modified product of alkyd resin or organic silicon-modified products of alkyd resin.

The thickening resin is able to very quickly elevate the overall viscosity of the ink composition. For the metallic pigment, proper viscosity is the key to maintain suspension property and too high or too low viscosity both will affect performance of the ink composition, thus thickening resin content must be appropriate.

In the present invention, the mass ratio of the film-forming resin to the thickening resin is 1:(1-20) and can be preferably 1:(2-10) and can also be more preferably 1:(3-8). If the content of the thickening resin is too low, viscosity of the ink composition will be too low and suspension stability of the ink composition will be worse; if too high, it will cause such problems as unsmooth writing or bad writing markings. If the content of the film-forming resin is too low, the writing markings will not be too smooth, which affects writing feelings of writers; if the content of the film-forming resin is too high, it can affect the directional alignment of the metallic pigments and at the same time can also make viscosity of the ink composition too high, causing writing difficulty.

<A Colorant>

The colorant is used to provide writing markings with different colors. According to the needs of the composition, organic pigments that can be easily dispersed in alcohol-based solvent is selected, which can be preferably selected from phthalocyanine pigment and/or azo organic pigment.

The organic pigment possesses good chromacity, luster and bright and brilliant color, making writing markings more bright and lively, and it does not contain harmful heavy metal elements in its structure, making the ink composition be environmental friendly and harmlessly. The phthalocyanine pigments are able to provide blue or green color; azo pigments can provide red, yellow or orange color, which are very suitable for being used in the ink composition of the present invention to give it the required colors.

<Auxiliary Agents>

In addition to the above components, the ink composition of the present invention can also include a series of auxiliary agents; these auxiliary agents can be any one or more than one of a wetting dispersant, a viscosity conditioning agent and an organic amine.

Wetting Dispersant

The wetting dispersant of the present invention is used for wetting and dispersing the metallic pigment in the alcohol-based solvent, which are able to reduce interfacial tension between liquid phase and solid phase, improve the dispersion efficiency of the metallic pigment, shorten the preparation time and are also capable of being adsorbed on surfaces of ionized metallic pigment to produce charge repulsion and/or form steric hindrance so as to prevent the metallic pigment particles from flocculation and then slow their settling velocity.

The wetting dispersant of the present invention selects a mixture of the block copolymer and wetting type organic silicon compounds, such as BYK-2150, BYK-2102 from BYK Chemie, Silok-7117, or polyester-type high molecular polymer wetting dispersant, i.e. Silok—7118 from Silok.

Viscosity Conditioning Agent

The viscosity conditioning agent is used to enhance the thixotropy of the ink composition and improve the storage property of the ink at high temperature. The present invention chooses anti-settling wax or fumed silica.

Organic Amine

The organic amines are used to adjust the pH value of the ink composition, make its pH in a reasonable range, and prevent the metallic pigment and colorant from flocculating near isoelectric point. Organic amine can be selected from triethanolamine. The pH value of the ink composition should be greater than 7, preferably 8 to 10.

[The Preparation Method of the Ink Composition]

The preparation method of the ink composition of the present invention comprises the following steps:

a. Adding the metallic pigment, the resin, the organic pigment, the auxiliary agents according to above-mentioned proportion, and use the solvent as a remainder;

b. Mixing the above components to obtain the metallic ink composition of the present invention.

[A Writing Instrument]

A writing instrument comprises a ink reservoir for storing the above mentioned ink composition and a writing component that is connected to the ink reservoir via pipeline and used for writing the ink composition onto media The further illustrations are made in connection with the following examples and comparative examples.

Example 1

Example 1 provides an ink composition, components of which and their contents are shown in below table 1.

TABLE 1 a table of contents of components of the ink composition

| Class | Subclass | Contents (wt %) |
|---|---|---|
| Main solvent | Ethanol | 66.8 |
| Auxiliary solvent | Propylene glycol methyl ether | 10 |
| Metallic pigment | Aluminum pigment (after coating treatment) | 7.5 |
| Film-forming resin | Polyvinyl butyral resin | 2.7 |
| Thickening resin | Phenolic resin | 10 |
| Viscosity conditioning agent | Fumed silica | 1 |
| Organic amine | Triethanolamine | 1 |
| Wetting dispersant | BYK-2102 | 1 |

The ink composition obtained in Example 1 is a silver ink composition whose surfaces display stronger metallic luster. By means of writing instruments (such as marker pen), it can form smooth and even writing markings on surfaces of wring media (such as paper, black cardboard surface, ceramic surface or glass surface, etc.). The writing markings contain high-density metal particles with metallic luster, and can also be written normally after aging test. Aging test is that the ink composition is loaded into wring instruments, the nips of which are then placed upward, downward and horizontally in an oven at a temperature of 50° C. for 4 weeks, after which the wring instruments are taken out and the writing are carried out.

Comparative Example 1

In comparative example 1, propanediol methyl ether as an auxiliary solvent is not added. Components of the material system of the comparative example 1 and their contents are shown in below table 2.

TABLE 2 a table of contents of components of the ink composition

| Class | Subclass | Contents (wt %) |
|---|---|---|
| Main solvent | Ethanol | 76.5 |
| Metallic pigment | Aluminum pigments (after coating treatment) | 7.5 |
| Film-forming resin | Polyvinyl butyral resin | 2.5 |
| Thickening resin | Phenolic resin | 10 |
| Viscosity conditioning agent | Fumed silica | 1 |
| Organic amine | Triethanolamine | 1 |
| Wetting dispersant | BYK-2102 | 1 |

In comparative example 1, it has been found after testing that after propanediol methyl ether being removed, leaf floating effect of the metallic pigment in ink is less than that of the example 1, and so does the metallic luster of writing markings, which illustrates the directional alignments of metallic pigments are getting worse, proving that the addition of propylene glycol methyl ether (as an auxiliary solvent) in the ethanol solvent (as a main solvent) is conducive to regulating the system's polarity, thus improving the directional alignment of the metallic pigment.

Comparative Example 2

In comparative example 2, the thickening resin of example 1 is solo used without addition of film-forming resin. Components of the material system of the comparative example 2 and their contents are shown in below table 2.

TABLE 3 a table of contents of components of the ink composition

| Class | Subclass | Contents (wt %) |
|---|---|---|
| Main solvent | Ethanol | 66.7 |
| Auxiliary solvent | Propylene glycol methyl ether | 10 |
| Metallic pigment | Aluminum pigments (after coating treatment) | 7.3 |
| Thickening resin | Phenolic resin | 13 |
| Viscosity conditioning agent | Fumed silica | 1 |
| Organic amine | Triethanolamine | 1 |
| Wetting dispersant | BYK-2102 | 1 |

In comparative example 2, it has been found after testing that when thickening resin is solo used without film-forming resin and under the conditions that the overall consumption of the resin is consistent with that of example 1, writing fluency is worse than that of example 1 and metallic luster and metallic appearance of the writing markings are weaker than that of example 1. This is because the use of film-forming resin can decrease the thickness of marklings' film, which is conducive to the directional alignment of metallic pigments. This comparative example illustrates that the solo use of thickening resin can lead to too high viscosity of inks and the conveying of the inks is getting difficult while in writing, so enough metallic pigment particles cannot be easily conveyed to the writing instruments (e.g., pen nibs) and fluently arrives to surfaces of media through pen nibs.

Comparative Example 3

In comparative example 3, the film-forming resin of example 1 is solo used without addition of thickening resin. Components of the material system of the comparative example 3 and their contents are shown in below table 4.

TABLE 4 a table of contents of components of the ink composition

| Class | Subclass | Contents (wt %) |
|---|---|---|
| Main solvent | Ethanol | 67.5 |
| Auxiliary solvent | Propylene glycol methyl ether | 10 |
| Metallic pigment | Aluminum pigments (after coating treatment) | 7.5 |
| Film-forming resin | Polyvinyl butyral resin | 12 |
| Viscosity conditioning agent | Fumed silica | 1 |
| Organic amine | Triethanolamine | 1 |
| Wetting dispersant | BYK-2102 | 1 |

In comparing example 3, it has been found after testing that when film-forming resin is solo used without thickening resin, under the conditions that the overall consumption of the resin is consistent with that of example 1, writing markings formed on media surfaces for a very beginning period of time are basically the same as those of example 1, but after aging test, the inks cannot be written normally and pen nibs pipes out clear liquids. This phenomenon illustrates that if an appropriate amount of thickening resin is not used, viscosity of the ink composition cannot reach a certain degree, so the metallic pigments dispersed therein are easier to precipitate. After four weeks of aging test, the metallic pigments are deposited at the bottom, which affects the conveying performance and thus causes the pen nibs to pipe out clear liquids.

Example 2

Example 2 provides an ink composition, components of which and their contents are shown in below table 5.

TABLE 5 a table of contents of components of the ink composition

| Class | Subclass | Content (wt %) |
| --- | --- | --- |
| Main solvent | Ethanol | 61.7 |
| Metallic pigment | Copper zinc alloy pigment (60:40) (after coating treatment) | 18 |
| Film-forming resin | Polyvinyl butyral resin | 1.3 |
| Thickening resin | Alkyd resin | 12 |
| Viscosity conditioning agent | anti-settling wax | 2 |
| Organic amine | Triethanolamine | 1 |
| Wetting dispersant | Silok-7118 | 4 |

Wherein, in copper zinc alloy of table 5, the weight ratio of copper and zinc is 60:40.

The ink composition obtained in Example 2 is a gold ink composition whose surfaces display stronger metallic luster. By means of writing instruments (such as marker pen), it can form smooth writing markings with metallic luster on surfaces of wring media (such as paper, black cardboard surface, ceramic surface or glass surface, etc.). The writing markings contain high-density metal particles. These phenomena prove that the ink composition shows good writing abilities on different surfaces of objects and the writing markings it forms is smooth, displays strong metallic luster and is still able to be written after aging test at a temperature of 50° C. for 4 weeks.

Comparative Example 4

In comparative example 4, the main solvent used is phenoxyethanol. Components of the material system of the comparative Example 4 and their contents are shown in below table 6.

TABLE 6 a table of contents of components of the ink composition

| Class | Subclass | Content (wt %) |
| --- | --- | --- |
| Main solvent | Phenoxyethanol | 61.7 |
| Metallic pigment | Copper zinc alloy pigment (60:40) (after coating treatment) | 18 |
| Film-forming resin | Polyvinyl butyral resin | 1.3 |
| Thickening resin | Alkyd resin | 12 |
| Viscosity conditioning agent | anti-settling wax | 2 |
| Organic amine | Triethanolamine | 1 |
| Wetting dispersant | Silok-7118 | 4 |

Wherein, in copper zinc alloy of table 6, the weight ratio of copper and zinc is 60:40.

In comparative example 4, it has been found after testing that when the low-level monohydric alcohol solvent ethanol is replaced with phenoxyethanol, the resin cannot be well extending in the system, affecting leaf floating effect and directional alignment of the metallic pigments, and thus cannot obtain practically useful ink composition, which indicates that low-level monohydric alcohol solvent is conducive to dispersion of the metallic pigments and dissolution of the resin and thus is beneficial to maintain the stability of the ink composition.

Comparative Example 5

In comparative example 5, the thickening resin of example 2 is solo used without addition of film-forming resin. Components of the material system of the comparative Example 5 and their contents are shown in below table 7.

TABLE 7 a table of contents of components of the ink composition

| Class | Subclass | Content (wt %) |
| --- | --- | --- |
| Main solvent | Ethanol | 62 |
| Metallic pigment | Copper zinc alloy pigment (60:40) (after coating treatment) | 18 |
| Thickening resin | Alkyd resin | 13 |
| Viscosity conditioning agent | anti-settling wax | 2 |
| Organic amine | Triethanolamine | 1 |
| Wetting dispersant | Silok-7118 | 4 |

Wherein, in copper zinc alloy of table 7, the weight ratio of copper and zinc is 60:40.

In comparative example 5, it has been found after testing that when the thickening resin is solo used without film-forming resin, under the conditions that the overall consumption of the resin is consistent with that of example 2, writing fluency is worse than that of example 2 and metallic luster and metallic appearance of the writing markings are weaker than that of example 2. This comparative example illustrates that the solo use of thickening resin can lead to too high viscosity of inks and the conveying of the inks is getting difficult while in writing, so enough metallic pigment particles cannot be easily conveyed to the writing instruments (e.g., pen nibs) and fluently arrives to surfaces of media through pen nibs.

Comparative Example 6

In comparative example 6, the film-forming resin of example 2 is solo used without addition of thickening resin. Components of the material system of the comparative example 6 and their contents are shown in below table 8.

TABLE 8 a table of contents of components of the ink composition

| Class | Subclass | Content (wt %) |
| --- | --- | --- |
| Main solvent | Ethanol | 61 |
| Metallic pigment | Copper zinc alloy pigment (60:40) (after coating treatment) | 18 |

TABLE 8-continued a table of contents of components of the ink composition

| Class | Subclass | Content (wt %) |
|---|---|---|
| Film-forming resin | Polyvinyl butyral resin | 14 |
| Viscosity conditioning agent | anti-settling wax | 2 |
| Organic amine | Triethanolamine | 1 |
| Wetting dispersant | Silok-7118 | 4 |

Wherein, in copper zinc alloy of table 8, the weight ratio of copper and zinc is 60:40.

In comparative example 6, it has been found after testing that when film-forming resin is solo used without thickening resin, under the conditions that the overall consumption of the resin is consistent with that of example 2, writing markings formed on media surfaces for a very beginning period of time is basically the same as those of example 2, but after aging test, the inks cannot be written normally and pen nibs pipes out clear liquids. This phenomenon shows that if an appropriate amount of thickening resin is not used, viscosity of ink composition cannot reach a certain degree, so the metallic pigments dispersed therein are easier to precipitate. After four weeks of aging test, the metallic pigments are deposited at the bottom, which significantly affects the conveying performance and thus makes the pen nibs pipe out clear liquids.

Example 3

Example 3 provides an ink composition, components of which and their contents are shown in below table 9.

TABLE 9 a table of contents of components of the ink composition

| Class | Subclass | Content (wt %) |
|---|---|---|
| Main solvent | Ethanol | 56.7 |
| Auxiliary solvent | Propylene glycol | 5 |
| Metallic pigment | Copper zinc alloy pigment (80:20) (after coating treatment) | 18 |
| Film-forming resin | Polyvinyl butyral resin | 1.3 |
| Thickening resin | Alkyd resin | 12 |
| Viscosity conditioning agent | Fumed silica | 3 |
| Organic amine | Triethanolamine | 1 |
| Wetting dispersant | Silok-7117 | 3 |

Wherein, in copper zinc alloy of table 9, the weight ratio of copper and zinc is 60:40.

The ink composition obtained in example 3 is a copper ink composition whose surfaces display stronger metallic luster. By means of writing instruments (such as marker pen), it can form smooth writing markings on surfaces of wring media (such as paper, black cardboard surface, ceramic surface or glass surface, etc.). The writing markings contain high-density metal particles and display metallic luster. It can still be written after aging test at a temperature of 50° C. for 4 weeks.

Comparative Example 7

In comparative example 7, the main solvent is phenoxyethanol. Components of the material system of the comparative Example 4 and their contents are shown in below table 10.

TABLE 10 a table of contents of components of the ink composition

| Class | Subclass | Content (wt %) |
|---|---|---|
| Main solvent | Phenoxyethanol | 61.7 |
| Metallic pigment | Copper zinc alloy pigment (80:20) (after coating treatment) | 18 |
| Film-forming resin | Polyvinyl butyral resin | 1.3 |
| Thickening resin | Alkyd resin | 12 |
| Viscosity conditioning agent | Fumed silica | 3 |
| Organic amine | Triethanolamine | 1 |
| Wetting dispersant | Silok-7117 | 3 |

Wherein, in copper zinc alloy of table 10, the weight ratio of copper and zinc is 80:20.

In comparative example 7, it has been found after testing that when the low-level monohydric alcohol solvent ethanol is replaced with phenoxyethanol, the resin are not able to well extend in the system, which affects leaf floating effect and directional alignment of the metallic pigments, and thus practically useful ink composition cannot be obtained, indicating that low-level monohydric alcohol solvent helps dispersion of metallic pigments and dissolution of resin and thus is beneficial to maintain the stability of the whole ink composition.

Comparative Example 8

In comparative example 8, the thickening resin of example 3 is solo used without addition of film-forming resin. Components of the material system of the comparative example 7 and their contents are shown in below table 11.

TABLE 11 a table of contents of components of the ink composition

| Class | Subclass | Content (wt %) |
|---|---|---|
| Main solvent | Ethanol | 56 |
| Auxiliary solvent | Propylene glycol | 5 |
| Metallic pigment | Copper zinc alloy pigment (80:20) (after coating treatment) | 18 |
| Thickening resin | alkyd resin | 14 |
| Viscosity conditioning agent | Fumed silica | 3 |
| Organic amine | Triethanolamine | 1 |
| Wetting dispersant | Silok-7117 | 3 |

Wherein, in copper zinc alloy of table 11, the weight ratio of copper and zinc is 80:20.

In comparative example 8, it has been found after testing that when thickening resin is solo used without film-forming resin, under the conditions that the overall consumption of the resin is consistent with that of example 2, writing fluency is worse than that of example 3 and metallic luster and metallic appearance of the writing markings are weaker than that of example 3. The phenomenon of this comparative example illustrates that the solo use of thickening resin can lead to too high viscosity of inks and the conveying of the inks is getting difficult while in writing, so enough metallic pigment particles cannot be easily conveyed to the writing instruments (e.g., pen nibs) and fluently arrives to surfaces of media through pen nibs.

Comparative Example 9

In comparative example 9, the film-forming resin of example 3 is solo used without addition of thickening resin.

Components of the material system of the comparative example 9 and their contents are shown in below table 12.

TABLE 12 a table of contents of components of the ink composition

| Class | Subclass | Content (wt %) |
|---|---|---|
| Main solvent | Ethanol | 58 |
| Auxiliary solvent | Propylene glycol | 5 |
| Metallic pigment | Copper zinc alloy pigment (80:20) (after coating treatment) | 18 |
| Film-forming resin | Polyvinyl butyral resin | 12 |
| Viscosity conditioning agent | Fumed silica | 3 |
| Organic amine | Triethanolamine | 1 |
| Wetting dispersant | Silok-7117 | 3 |

Wherein, in copper zinc alloy of table 12, the weight ratio of copper and zinc is 80:20.

In comparative example 9, it has been found after testing that when film-forming resin is solo used without thickening resin, under the conditions that the overall consumption of the resin is consistent with that of example 3, writing markings formed on media surfaces for a very beginning period of time are basically the same as those of example 3, but after aging test, the inks cannot be written normally and pen nibs pipes out clear liquids. This phenomenon shows that if an appropriate amount of thickening resin is not used, viscosity of ink composition cannot reach a certain degree so the metallic pigments dispersed therein are easier to precipitate. After four weeks of aging test, the metallic pigments are deposited at the bottom, which significantly affects the conveying performance and thus makes the pen nibs pipe out clear liquids.

Example 4

The example 4 provides an ink composition, components of which and their contents are shown in below table 13.

TABLE 13 a table of contents of components of the ink composition

| Class | Subclass | Content (wt %) |
|---|---|---|
| Main solvent | Ethanol | 46.8 |
| Auxiliary solvent | Butyl acetate | 10 |
| Metallic pigment | Aluminum pigments (after coating treatment) | 7.5 |
| Film-forming resin | Polyvinyl butyral resin | 2.7 |
| Thickening resin | Phenolic resin | 10 |
| Organic pigments | Phthalocyanine pigment blue | 20 |
| Viscosity conditioning agent | Fumed silica | 0.8 |
| Organic amine | Triethanolamine | 1.2 |
| Wetting dispersant | BYK-2102 | 1 |

The ink composition obtained in Example 4 is a blue ink composition whose surfaces display stronger metallic luster. By means of writing instruments (such as marker pen), it can form smooth writing markings with metallic luster on surfaces of wring media (such as paper, black cardboard surface, ceramic surface or glass surface, etc.). The writing markings contain high-density metal particles. These phenomena prove that the ink composition of the present invention shows good writing abilities on surfaces of different objects and the writing markings it forms is smooth, displays strong metallic luster and can still be written after aging test at a temperature of 50° C. for 4 weeks.

Comparative Example 10

In comparative example 10, the main solvent is deionized water. Components of the material system of the comparative example 10 and their contents are shown in below table 14.

TABLE 14 a table of contents of components of the ink composition

| Class: | Subclass | Content (wt %) |
|---|---|---|
| Main solvent | Deionized water | 46.8 |
| Auxiliary solvent | Butyl acetate | 10 |
| Metallic pigment | Aluminum pigments (after coating treatment) | 7.5 |
| Film-forming resin | Polyvinyl butyral resin | 2.7 |
| Thickening resin | Phenolic resin | 10 |
| Organic pigments | Phthalocyanine pigment blue | 20 |
| Viscosity conditioning agent | Fumed silica | 0.8 |
| Organic amine | triethanolamine | 1.2 |
| Wetting dispersant | BYK-2102 | 1 |

It has been found after testing that the ink composition obtained in comparative example 10 cannot form the same stable suspension system as example 4. The resin cannot be fully dissolved and organic pigments can be effectively dampened, writing effect cannot satisfy the requirements and the coloration is not obvious.

Example 5

Example 5 provides an ink composition, components of which and their contents are shown in below table 15.

TABLE 15 a table of contents of components of the ink composition

| Class: | Subclass | Content (wt %) |
|---|---|---|
| Main solvent | Ethanol | 44.5 |
| Auxiliary solvent | Butyl acetate | 4 |
| Auxiliary solvent | Dipropylene glycol methyl ether | 6 |
| Metallic pigment | Aluminum pigments (after coating treatment) | 7.5 |
| Film-forming resin | Polyvinyl butyral resin | 3 |
| Thickening resin | Phenolic resin | 10 |
| Organic pigments | Azo dye red | 20 |
| Viscosity conditioning agent | Fumed silica | 2 |
| Organic amine | Triethanolamine | 1 |
| Wetting dispersant | BYK-2102 | 2 |

The ink composition obtained in Example 5 is a red ink composition whose surfaces display stronger metallic luster. By means of writing instruments (such as marker pen), it can form smooth writing markings with metallic luster on surfaces of wring media (such as paper, black cardboard surface, ceramic surface or glass surface, etc.). The writing markings contain high-density metal particles. These phenomena prove that the ink composition shows good writing abilities on surfaces of different objects and the writing markings it forms is smooth, displays strong metallic luster and can still be written after aging test at a temperature of 50° C. for 4 weeks.

Comparative Example 11

In comparative example 11, the main solvent of example 5 is replaced with deionized water. Components of the material system of the comparative Example 11 and their contents are shown in below table 16.

TABLE 16 a table of contents of components of the ink composition

| Class | Subclass | Content (wt %) |
|---|---|---|
| Main solvent | Ethanol | 54.5 |
| Auxiliary solvent | Butyl acetate | 4 |
| Auxiliary solvent | Dipropylene glycol methyl ether | 6 |
| Metallic pigment | Aluminum pigments (after coating treatment) | 7.5 |
| Film-forming resin | Polyvinyl butyral resin | 3 |
| Thickening resin | Phenolic resin | 10 |
| Organic pigments | Azo dye red | 20 |
| Viscosity conditioning agent | Fumed silica | 2 |
| Organic amine | Triethanolamine | 1 |
| Wetting dispersant | BYK-2102 | 2 |

It has been found after testing that the ink composition obtained in comparative example 11 cannot form the same stable suspension system as example 5. The resin cannot be fully dissolved and organic pigments can be effectively dampened, writing effect cannot satisfy the requirements and the coloration is not obvious.

Example 6

The present example provides a writing instrument, comprising a ink reservoir for storing the ink composition of the present invention, and a writing component that is connected to the ink reservoir via pipeline and used for writing the ink composition onto media. The ink reservoir can be made from low density fibrous materials, e.g. low density polyester fibers; In addition, pen nibs can include porous macromolecular fibers that have been essentially used at present, e.g. polyacrylic acid fibers; other structures are as same as those of writing instruments of the prior art (such as pen, marker and other writing instruments that uses ink) and will not be given more details herein.

The above descriptions of examples are conducive for ordinary technicians of the present technical field to understand and exploit the invention. It is obvious that persons skilled in the art of the present field can easily make various amendments to the above examples and apply the general principle illustrated in here into other examples without the effort of inventive work. Therefore, the present invention is not confined to examples herein. Any improvements and modifications conducted by persons skilled in the art of the present field according to the instructions of the present invention and without going beyond the scope of the present invention shall be included in the extent of protection of the present invention.

What is claimed is:

1. An ink composition comprising 45 to 50 wt % of a metallic pigment coated by silica and long-chain aliphatic compound, 10 to 20 wt % of a resin, 5 to 15 wt % of a colorant, 2 to 15 wt % of an auxiliary agent and a solvent as the remainder; the sum of contents of each component is 100 wt %;
wherein the solvent is selected from the group consisting of a main solvent, and a mixture of the main solvent and an auxiliary solvent;
wherein the main solvent is a low-level monohydric alcohol solvent and is at least one selected from the group consisting of ethanol, propanol, butanol and pentanol;
wherein the auxiliary solvent is at least one selected from the group consisting of a polyol solvent, an ether solvent and an ester solvent that are capable of mutually dissolving into the low-level monohydric alcohol solvent;
wherein the metallic pigment is selected from the group consisting of Zn and Cu—Zn alloy, and an average particle size of the metallic pigment coated by silica and long-chain aliphatic compound is between 2 and 15 µm;
wherein the resin comprises a film-forming resin and a thickening resin;
wherein the film-forming resin is selected from the group consisting of glutaraldehyde-modified products of the polyvinyl butyral resin, and aromatic dialdehydes-modified products of the polyvinyl butyral resin; wherein the thickening resin is selected from the group consisting of amine-modified products of the phenolic resin, organic silicon-modified products of the phenolic resin, acrylic acid-modified products of the alkyd resin, and organic silicon-modified products of the alkyd resin; where in the weight ratio of the film-forming resin to the thickening resin is between 1:1 and 1:20;
wherein the colorant is phthalocyanine pigment or azo pigment; and
wherein the auxiliary agent is at least one selected from the group consisting of a wetting dispersant, a viscosity conditioning agent and an organic amine.

2. The ink composition as claimed in claim 1 wherein the polyol solvent is at least one selected from the group consisting of dihydric alcohol and trihydric alcohol.

3. The ink composition as claimed in claim 1 wherein the ether solvent is at least one selected from the group consisting of propylene glycol methyl ether, butyl glycol methyl ether, and dipropylene glycol methyl ether.

4. The ink composition as claimed in claim 1 wherein the ester solvent is at least one selected from the group consisting of ethyl acetate and butyl acetate.

5. The ink composition as claimed in claim 1, wherein the weight ratio of the film-forming resin to the thickening resin is between 1:2 and 1:10.

6. The ink composition as claimed in claim 1 wherein ratio of the film-forming resin to the thickening resin is between 1:3 and 1:8.

7. The ink composition as in claim 1, wherein the auxiliary agent is at least one of a wetting dispersant selected from the group consisting of a mixture of block copolymer and wetting type organic silicon compounds; a viscosity conditioning agent selected from the group consisting of an anti-settling wax and a fumed silica; and triethanolamine.

8. A writing instrument comprising:
an ink reservoir storing the ink composition as claimed claim 1;
a writing component; and
a pipeline, wherein the ink reservoir is operationally connected to the writing component through the pipeline through which the ink composition can be delivered to the writing component and used for writing the ink composition onto media.

* * * * *